Oct. 23, 1951  E. T. CASELLINI  2,572,801
ELECTRICAL RECTIFIER

Filed June 23, 1943  2 SHEETS—SHEET 1

Ezio Thomas Casellini  INVENTOR.

BY Lawrence Burns,
ATTORNEY

Oct. 23, 1951  E. T. CASELLINI  2,572,801
ELECTRICAL RECTIFIER
Filed June 23, 1943  2 SHEETS—SHEET 2

EZIO THOMAS CASELLINI  INVENTOR.

BY
ATTORNEY

Patented Oct. 23, 1951

2,572,801

UNITED STATES PATENT OFFICE 2,572,801

ELECTRICAL RECTIFIER

Ezio Thomas Casellini, Salem, Mass., assignor to Sylvania Electric Products Inc., Salem, Mass., a corporation of Massachusetts Application June 23, 1943, Serial No. 492,163

5 Claims. (Cl. 250—31)

This invention relates to electrical rectification and has as an object the provision of an improved electrical rectifier and method of making same.

Another object is to provide an improved super-high frequency rectifier.

Another object is to provide a rectifier of the crystal type with a high stability characteristic under mechanical or electrical shock, and/or wide temperature variation; which is resistant to moisture; and has a high burn out characteristic.

Other objects, advantages, and features will be apparent from the following specification taken in conjunction with the accompanying drawings in which.

Figure 1:
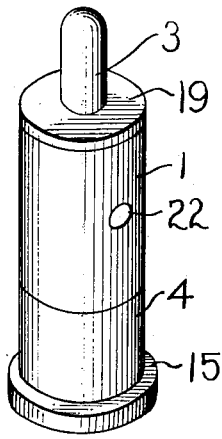
Figure 1 is a perspective of a crystal rectifier unit embodying an illustration of this invention.

Crystal rectifiers have the useful characteristic of providing a ready path for electric current in one direction and a barrier against current flow in the opposite direction. As in alternating current use, the current in the first direction is called front current, and such current as may get through in the opposite direction is called back current.

The term rectifier as defining a unit embodying this invention includes the use of the invention under any conditions of circuit or other arrangement where free current flow in one direction, and a current barrier in the other is desired.

A crystal rectifier comprises essentially, a crystal body of galena, silicon, or other material of similar characteristics, with a substantially flat surface, and a pointed wire, with the point resting on the flat surface. The nature of the crystal is such that variation of the location and/or contact pressure of the wire contact on the crystal surface results in variation of the functioning of the rectifier.

Disadvantages in crystal rectifiers have been instability under mechanical or electrical shock, temperature variation, exposure to moisture, and low burn out or power characteristics.

This invention obviates the above disadvantages by forming and assembling the unit so that the normal tendency is for the contact wire to stay at the desired point on the crystal despite mechanical shock; by providing cushioning material as a shield for the contact wire and the crystal; by conditioning treatment as a protection against electrical shock; by balancing all parts of the unit against thermal action; by providing a seal for the crystal and wire against moisture; by particular processing of the unit parts, especially the contact wire and the crystal, to provide a high burn out characteristic; and otherwise in accordance with the following description and the accompanying drawings. A crystal in which the current which burns out or spoils it is comparatively high is said to have a high burn out characteristic.

While this invention is particularly directed to crystal units for use in super high frequency devices, it is not limited to such use and may readily be applied to other devices and other frequencies.

The accompanying drawings represent an illustrative embodiment of this invention. The overall dimensions of a unit of this character may be set up as required to meet particular needs. In the embodiment at hand, the unit has a length of the order of three-fourths of an inch, with the other dimensions in proportion thereto substantially as shown in the drawings. This unit is primarily intended for use in super high frequency devices—and has such sensitivity that crystal noise is a factor of importance. The unit has inherently low capacity and is adapted for extremely high sensitivity as a detector or a mixer.

Figure 3:
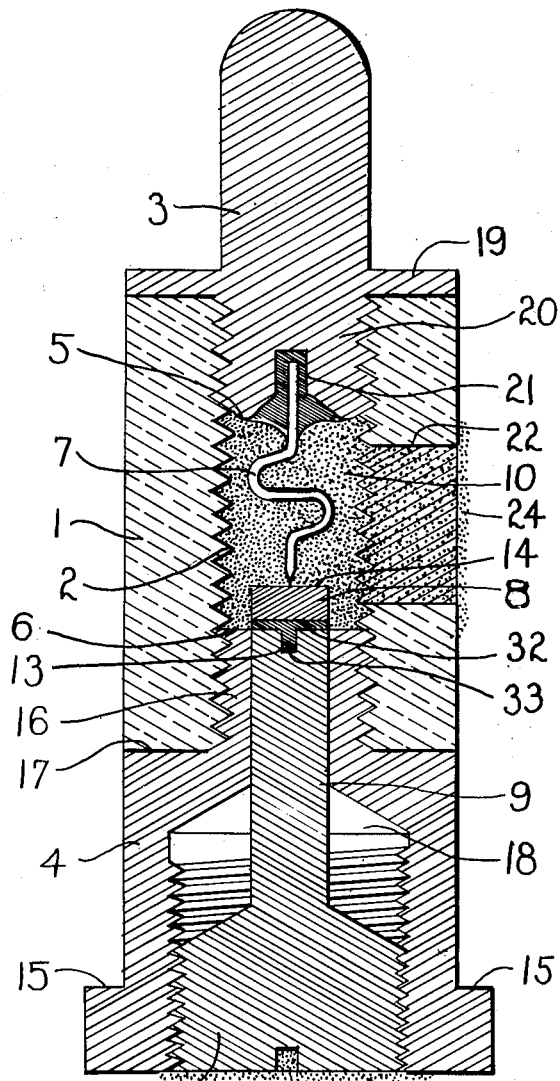
Figure 3 is an enlargement of the unit of Figures 1 and 2, in central longitudinal section.

With particular reference to Figure 3, the unit comprises, as a frame structure, an electrical insulator ceramic cylindrical sleeve 1, interiorly threaded as at 2, with an electrical conductor member 3 threaded in one end and another electrical conductor member 4 threaded in the other end. This arrangement provides a structure comprising a pair of conductor members separated by an insulating member to form an enclosure defined by the ends 5 and 6 respectively of the conductors 3 and 4, and the portion of the inner threaded wall of the sleeve 1 which lies between the conductor ends 5 and 6.

In this enclosure the heart of the unit is set up in the contact between a flexible conductor wire 7 and a crystal 8. The conductor wire 7 is mechanically and electrically connected, at one end, to the conductor member 3, and has an effectively true right circular conical formation on the other end to provide point area contact with a surface of the crystal 8.

This conical form has been found efficient and effective in providing the desired point to surface contact between the wire 7 and the crystal 8. Similarly, contact members corresponding to the wire 7 may have line contact edges, as like the sharp edge of a wedge, or others, from which a contact area may be used to engage the crystal 8. The contact pressure is determined and applied as a factor in the assembly of the unit, and is used with an eye to the strength of the material of the wire 7 so that the contact point or edge does not become blunted with consequent increase in crystal contact area.

The crystal 8 is mechanically and electrically connected to the conductor member 4 through its mounting on a crystal support 9 which in turn is mounted in the conductor member 4.

Thus the fundamental arrangement of a crystal rectifier unit is provided, with a pair of conductors joined only through a point to surface contact of a wire and a crystal. Current may readily flow from the wire to the crystal, but is blocked in the opposite direction by the crystal's resistance to conduction and the low capacity effect between the crystal and the wire point.

Many attempts have been made to produce an efficient, dependable crystal unit of this type, but these have been unsuccessful prior to the innovations of this invention. When in use, circuit connections are made to the conductor members 4 and 5 by means of clamps, sockets, or the like.

As in Figure 3, the wire 7 and crystal 8 are cushioned against temperature and pressure variation, and mechanical shock, by granulated material 10, relatively loosely packed in the enclosure. This material may be Alundum powder or other suitable cushioning material, for example, a rubbery mix of "paratac" and "opal" (wax) may be used, giving, in addition, further protection against moisture.

In the formation of the unit prior to assembly—

The crystal 8 is formed of silicon, galena, germanium, or like material. When silicon is used, a body of about 100 grams of powder, granulated to the order of 3820 mesh, is melted down in an Alundum crucible in a vacuum induction furnace. A trace of aluminum from the crucible enters the melt during heating. Other crucibles may be used if a trace of aluminum is otherwise added to the melt.

A silicon body without aluminum has very high front and back resistance if set up as a crystal. When aluminum is added as herein, in the order of one third of one percent, the high resistance is maintained in one direction and reduced in the other. It also makes the electrical conductivity factor of the crystal sensitive to contact pressure in that at very high pressures the conductivity becomes that of a straight conductor in which the electric flow is not rectified. As the pressure is reduced, the crystal becomes a rectifier.

The heating and cooling of the silicon-aluminum melt is very carefully controlled to drive all but a trace of the aluminum out of mixture or alloy with the silicon. The excess aluminum gathers in the boundaries of relatively large crystalline structure units in the silicon-aluminum body resultant of the melt.

Figure 4:
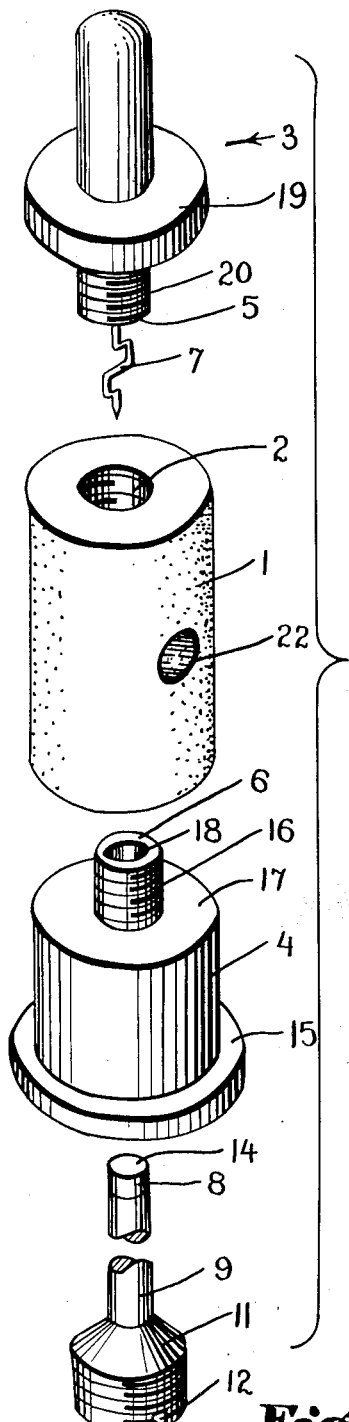
Figure 4 is an exploded enlargement of the unit of Figures 1-3.
Figure 5:
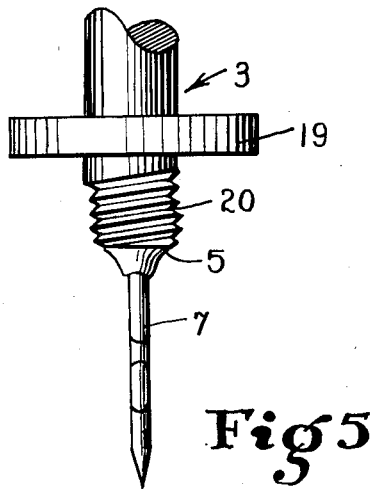
Figure 5 is an enlargement of the contact wire of the unit of Figures 1-4, turned 90° with respect to the position shown in Figure 3.

The melt is cooled to form a solid cup-shaped body which may be an inch or two in width and an inch in depth, although these dimensions are not critical. This solid body is then cut, by a diamond charged wheel, into strips of substantially square or rectangular cross-section with sides of the order of one twelfth of an inch. These strips are then broken up into lengths, as by pliers or other suitable means, to provide rough approximations of cubes, each of which is to form a crystal, as at 8, Figure 3. Each of the crystal cubes is thereafter cleaned with carbon tetrachloride, covered with silver paste comprising silver oxide and resin oils, baked to remove the oils, and then copper plated, to facilitate a soldering operation in mounting the crystal 8 on the support 9, Figures 3 and 4.

The support 9 is formed of brass, and gold plated to provide good electrical contact and prevent corrosion. Silver may be used instead if desired. It is formed with a threaded head 11 having a screw driver slot 12, and a relatively long, slim, cylindrical, unthreaded body with a recess 13 in its end.

The crystal 8 is then soldered on the unheaded end of the support 9, with the solder having a gripping area 32 contacting the crystal 8 and also an anchoring leg 33 extending into the recess 13. With the crystal 8 thus mounted on the support 9, the crystal is ground to provide a substantially flat outer surface 14 substantially at right angles to the longitudinal axis of the support 9, and to form the crystal sides into cylindrical shape in effective continuation of the cylinder form of the elongated body of the support 9. The outer crystal surface 14 is then etched with caustic soda, for example, 100 cc. of water with 10 grams of soda. This etching step cleans the surface of the crystal, roughs up the surface somewhat to provide contact points and also removes any portions of other material than that of the crystal so that the contact is directly between the surface of the crystal and the point area of the contact wire 7. If the wire 7 had contact with foreign matter instead of the crystal, the capacitive effect would essentially be between the body of the crystal and the body of the foreign matter with consequent reduction in the effectiveness of the point contact as a current barrier.

The conductor member 4 is formed of brass, and gold plated. It is generally cylindrical in shape, with an outer flange 15 on one end, a reduced, central, exteriorly threaded neck 16 at the other end, the formation of which leaves a shoulder 17, and an opening 18 extending longitudinally and centrally through the main body and through the neck 16. The opening 18, in its extent through the main body of the member 4, is of cylindrical formation of a size, and threaded, to receive the head 11 of the support 9; and in its extent through the neck 16, is of smooth walled cylindrical formation of such size as to provide a tight, bordering on force fitting, relation with the elongated body of the crystal support 9.

The support 9, with crystal 8 mounted thereon, is then mounted in the conductor 4 as shown in Figure 3, to form a sub-assembly comprising the conductor 4, the crystal support 9, and the crystal 8.

The conductor member 3 is solid, formed of brass and gold plated. It has a central flange 19 with an exteriorly threaded neck 20 on one side thereof and end recessed as at 21; and a cylindrical, rounded end body on the other side. The recess 21 is for receiving the contact wire 7 in its connection with the conductor member 3.

The contact wire 7 may be formed of circular cross-section tungsten wire, and shaped to form an S-like configuration with its ends aligned to define a single effectively straight line, and with the loops of the S equal and opposed with respect to that straight line so that both lie in a single plane. The contact wire 7 starts from its mounting in conductor 3 as a vertical straight member, then slopes out and down to the top loop of the S, then horizontally straight across to the bottom loop of the S, then it slopes in and down to a vertical straight portion in alignment with the other vertical straight portion. The crystal contact end is shaped as an effectively true right circular cone with effectively point area contact only for engagement with the crystal. This is in real distinction with respect to the customary idea of a pointed or sharp member. In comparison with an ordinary sewing needle, for example, the needle has a blunt, rounded end which would afford a surface area contact with the crystal and so defeat the effectiveness of the whole unit by reducing the current blocking capacitive effect of the contact between the contact wire and the crystal 8.

The resilience of the material of the wire 7 in combination with the particular formation of the loops thereof is such that after endwise pressure on the wire 7 has reached a certain strength, there is a possible range of further pressures which produce little effective change in the contact pressure between the wire 7 and the crystal 8, as compared to the applied pressure, the difference being absorbed in bending the loops of the wire 7. Thus in establishing contact pressure between the wire 7 and crystal 8 in assembly of the unit, the applied pressure value is not critical, within a given value range, since relatively large applied pressure variation produces relatively small contact pressure variation. Having assembled the unit, further applied pressure variation, as from expansion or contraction as the result of heat variation, or from mechanical shock, produces relatively small contact pressure variation. Thus any substantial loss in efficiency, as controlled by the contact pressure, is avoided.

Another feature in the matter of wire 7 and crystal 8 is the arrangement of the straight ends of the wire 7 in substantial alignment to define a single straight line. This arrangement, in combination with the wire loop formations as described, provides a straight line movement tendency in the pointed end of the wire 7 in substantial alignment with the line of the wire ends, upon expansion or contraction of, or endwise pressure on, the wire 7. This is particularly effective in maintaining the efficiency of the unit since the line of the ends of wire 7 is arranged in substantial perpendicularity with the outer crystal surface 14. Lateral moments of force, tending to change the location of the contact of the wire 7 on the crystal surface 14, are avoided.

The right circular conical formation of the contact end of wire 7 is produced by chucking the wire for rotation with its longitudinal axis at the desired conical angle with respect to a flat abrasive member and producing relative, straight line reciprocatory movement between the wire and the abrasive member with the wire in contact therewith during the movements in one direction only with the relative motion of the abrasive always down the slope of the cone toward its point.

The connection between the wire 7 and the conductor member 3 is accomplished by first copper plating the connection end of the wire 7 and firing to just below the melting point of copper, 1000° to 1100° C. to make the copper plastic and to partially alloy it with the tungsten wire, locating the copper plated end in the recess 21 of the conductor 3 with the longitudinal axis of the wire substantially in alignment with the longitudinal axis of the conductor 3, and then soldering wire 7 to conductor 3 in that relation. The tungsten may be nickel plated instead of copper plated, but copper is preferred because of lower melting temperature.

The ceramic sleeve 1 is formed of "Steatite" with a side wall opening 22 which, when the unit is assembled, leads to the enclosure containing the contact wire 7 and crystal 8. This opening is first used for inserting tweezers, pliers or the like to adjust the contact wire 7 to desired position of contact with the crystal 8, and later for inserting a cushioning powder.

Figure 2:
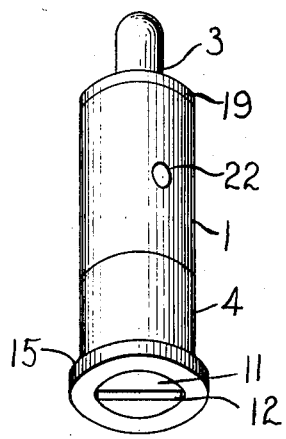
Figure 2 is a perspective of the unit of Figure 1, taken from another direction.

The sub-assembly holding the crystal 8, and the sub-assembly holding the contact wire 7 are then joined with the ceramic sleeve 1 to form the unit as shown in Figures 1–3, using Bakelite cement between the sleeve 1 and the shoulder 18 of conductor 4 and between the sleeve 1 and the flange 19 of conductor 3. Before the cement sets the unit is put in a tightening device arranged to apply a controlled torque to the conductor members 3 and 4 so that each unit is tightened with the same pressure, thus providing standardized contact wire-crystal engagement pressure. The assembly is thereafter baked for one to two hours at a temperature of the order of 80 to 100 degrees Centigrade to fix the Bakelite cement.

This cement may be a combination of shellac, rosin, Bakelite and marble flour, as disclosed in my application Serial No. 492,064 filed June 23, 1943, now abandoned, for "Cementing Compositions."

The crystal unit, thus assembled, is mounted in an electrical testing device and adjusted to produce stability against mechanical and electrical shock and the best possible front current without increasing the back current beyond a predetermined low limit. The low limit of resistance to back current in this unit should be of the order of 2000 ohms.

This adjustment comprises finding the best possible pressure and positional relation between the contact wire 7 and the crystal 8 to produce the most advantageous relation of front current to back current in the crystal. It is accomplished by rotating the unit about its longitudinal axis and tapping or jarring it during the rotation, adjusting the crystal support 9 in and out to achieve the proper contact pressure, and, if necessary adjusting the contact wire 7 to a different location of contact with the crystal 8 by inserting an adjusting tool into the enclosure through the opening 22 to engage and move the wire 7 as desired.

Having adjusted the unit at ½ volt 60 cycle A. C., the unit is shocked with 1½ volts on 60 cycle A. C., held for 15–30 seconds, and thereafter rechecked and if necessary, reset at the ½ volt level. This treatment stabilizes the unit, and aids in producing a high burn-out characteristic therefor. The specified voltage, frequency and time characteristics are illustrative and variable to meet different conditions.

The next step is to introduce a granular or powdery cushioning material into the enclosure about the contact wire 7 and crystal 8. This is done by pouring the cushioning material, which may be Alundum powder of the order of 320 mesh or the like, and is moisture resistant and non-conductive, through the ceramic sleeve wall opening 22, while jarring or vibrating the unit to settle and distribute the powder. This jarring or vibration is less in force than the previous similar action in the adjustment of the unit, and does not affect that adjustment. The Alundum powder provides a body which is moisture resistant, non-conductive, and has no chemical reaction with the crystal.

The opening 22 is then sealed with Alundum or other suitable cement. The Alundum cement is fine Alundum powder with a nitrocellulose amyl acetate base with dibutyl phthalate plasticizer. In this use of Alundum, it is in compressed paste form, as at 23, Figure 3, and hardens after its application to form a moisture resistant and non-conductive body.

To further seal the unit, a rubbery cement, for example, "Glyptal" is applied as at 24 and 25, Figure 3, to cover the filled opening 22 and the head 11 of the crystal support 9 and the thread of conductor opening 18.

An important feature of this invention is the formation of a standardized crystal rectifier unit. This is accomplished by the duplication of material and mechanical form and dimension of the various parts, the measured torsion of assembly, the adjustment of the unit to operation within given ranges of efficiency, mechanically and electrically shocking the unit into standardized mechanical and electrical stability, cushioning the contact wire and crystal, and sealing the contact wire against dirt and moisture.

Thus the extremely important features of interchangeability and standardization are provided.

The thermal expansion and contraction factors of the brass conductors 3 and 4, the crystal support 9, the ceramic sleeve 1, the tungsten wire 7 and the crystal 8 are all balanced in respect to composition and dimension, and in respect to the spring action of the wire 7. The unit of this invention is designed to maintain its function through a temperature range of $-40°$ C. to $70°$ C.

Figure 6:
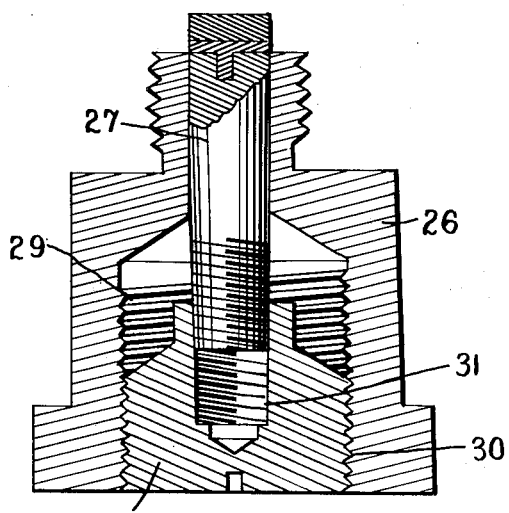
Figure 6 illustrates an alternate structure.

An alternate structure for providing minute, vernier type adjustment of the crystal toward or away from the contact wire is shown in Figure 6. This is in correspondence to the conductor member 4 and the crystal support 9, as in Figure 3.

It comprises a conductor member 26, a crystal support 27 mounted therein, and an adjustment screw 28. The conductor member 26 has an opening 29 therethrough receiving the support 27 in tight fitting relation at the top and enlarged below to receive the support 27 and the screw 28. Screw 28 is threaded in opening 29 as at 30 with one direction of pitch, and support 27 is threaded into recess 31 of screw 28 in an opposite direction of pitch. The pitch ratio of these two mountings is close, of the order of 49 to 50. Thus relatively large rotational movement of screw 28 will produce minute longitudinal movement of support 27. Ordinarily friction will prevent rotation of support 27. It may be keyed if desired.

What I claim is:

1. A crystal rectifying unit comprising: a hollow insulating member; a conductor member at each end of said hollow member to form an enclosure therewith; a resilient wire supported at one end by, and extending into said enclosure from, one of said conductor members, the other end of said wire being formed to a machined true right circular conical point, said wire being bent to have an S-shaped portion in a single plane with an elongated straight portion at each end of the S-shaped portion, said straight portions being in line with each other and in the plane of the S-shaped portion; a rectifying crystal supported by and electrically connected to the other of said conductor members inside said enclosure, said crystal having a flat surface in contact with the point of said resilient wire to form a rectifying contact.

2. A crystal rectifying unit comprising: a hollow insulating cylinder with open ends, the latter being internally threaded; a threaded metal crystal support screwed into one end thereof; a flat ended somewhat rough, etched crystal held by said support in firm metallic contact therewith; a threaded metal piece threaded into the other end of said insulating cylinder, a tungsten wire extending from said piece to the surface of said crystal, said wire having its two end portions straight and in line with each other, and having said end portions connected by an S-shaped portion, the entire wire lying in the plane of the S-portion, the wire having a pointed end in the form of a true right circular cone in contact with the flat, somewhat rough, etched surface of the crystal, the endwise pressure on said wire being sufficient to bring said pressure into the range when variations in said pressure are not critical to the rectifying action of the crystal; a filler in the space between the crystal support and the metal piece holding the wire; and a waterproof layer over the exterior of the unit between said support and said metal piece.

3. The combination of claim 2, a hole in the side of the insulating cylinder, and a cement filling the hole.

4. The combination of claim 2, in which the crystal is of germanium.

5. In a rectifier unit, a hollow insulating member, a metal conducting member at each end of said hollow member to form an enclosure therewith, a rectifying crystal mounted on and in electrical connection with one of said conducting members and having a flat somewhat rough etched surface in said enclosure, and a resilient conducting member in said enclosure, supported from and in electrical contact with the other of said conductor members and in point contact with the flat, etched surface of said crystal, the point contact being made by a machined right true circularly conical point on the end of the resilient wire.

EZIO THOMAS CASELLINI.

REFERENCES CITED

The following references are of record in the file of this patent:

UNITED STATES PATENTS

| Number | Name | Date |
| --- | --- | --- |
| Re. 18,579 | Ballantine et al. | Aug. 23, 1932 |
| 962,262 | Schloemilch et al. | June 21, 1910 |
| 1,052,355 | Manning | Feb. 4, 1913 |
| 1,386,227 | Becket | Aug. 2, 1921 |
| 1,537,856 | Michels et al. | May 12, 1925 |
| 1,586,672 | Hackett | June 1, 1926 |
| 1,622,459 | Lundquist | Mar. 29, 1927 |
| 1,708,571 | Hartmann et al. | Apr. 9, 1929 |
| 2,419,561 | Jones et al. | Apr. 29, 1947 |
| 2,430,028 | Pfann et al. | Nov. 4, 1947 |
| 2,432,116 | McLean et al. | Dec. 9, 1947 |

FOREIGN PATENTS

| Number | Country | Date |
| --- | --- | --- |
| 551,209 | Great Britain | Feb. 12, 1943 |

OTHER REFERENCES

Proceedings National Academy of Sciences, vol. 11, 1925, pages 743–748, "On Contact Rectification by Metallic Germanium," by Merritt.